United States Patent [19]

Kurima et al.

[11] 4,295,967

[45] Oct. 20, 1981

[54] FLUIDIZED BED CONTACT APPARATUS

[75] Inventors: Akinori Kurima; Yasuhiro Iwase; Tadao Kimiwada, all of Yokohama, Japan

[73] Assignee: Chiyoda Kako Kensetsu Kabushiki Kaisha, Tokyo, Japan

[21] Appl. No.: 62,049

[22] Filed: May 23, 1980

Related U.S. Application Data

[63] Continuation of Ser. No. 952,639, Oct. 19, 1978, abandoned, which is a continuation-in-part of Ser. No. 625,777, Oct. 24, 1975, abandoned.

[30] Foreign Application Priority Data

Oct. 26, 1974 [JP] Japan .............................. 49-123028

[51] Int. Cl.$^3$ ............................................. B01D 15/02
[52] U.S. Cl. ..................................... 210/189; 210/268; 422/140; 422/142; 422/216; 422/274
[58] Field of Search ...................... 55/79, 390; 210/33, 210/189, 268, 20; 422/278, 261, 274, 275, 140, 142, 216

[56] References Cited

U.S. PATENT DOCUMENTS

| | | | |
|---|---|---|---|
| 2,158,911 | 5/1939 | Pellar | 99/430 |
| 3,243,318 | 3/1966 | Mihara et al. | 210/33 |
| 3,468,633 | 9/1969 | Honchar | 422/278 |
| 3,797,665 | 3/1974 | Paquette | 210/447 |

Primary Examiner—Ivars C. Cintins
Attorney, Agent, or Firm—Armstrong, Nikaido, Marmelstein & Kubovcik

[57] ABSTRACT

Apparatus for liquid/solid contact including apparatus for single or multiple fluidized beds provided with one or more trays having a number of inverted frustum-shaped depressions with an opening located therein.

3 Claims, 5 Drawing Figures

FLUIDIZED BED CONTACT APPARATUS

This application is a continuation application of U.S. application Ser. No. 952,639, filed Oct. 19, 1978, which is a continuation-in-part application of U.S. application Ser. No. 625,777, filed Oct. 24, 1975, both of which are now abandoned.

BACKGROUND OF THE INVENTION

The present invention relates to a solid-liquid contact apparatus. More particularly, the present invention relates to a single or multiple fluidized bed contact apparatus which is provided with one or more trays that have a number of inverted frustum-shaped depressions located adjacent to each other (arranged in order), each of said frustum-shaped depressions having an opening at the upper base.

Heretofore, there have been proposed various systems in which particulate material and liquid are brought in countercurrent contact to effect adsorption, absorption or reaction between them. Of these systems, those which are in industrial practice may be divided into a fixed bed system and a fluidized bed system. The fluidized bed system is of more recent origin than the fixed bed system as a system. Moreover, as compared with the fixed bed system, the fluidized bed system has many advantageous points such that, for example, the entire surface of the solid material is effectively used, the reaction is achieved uniformly throughout the fluidized bed without the occurrence of local reaction and, further, the efficiency of the reaction is so outstandingly superior that it is often ten times as efficient as the fixed bed system, a completely continuous operation is possible, and so on. Thus, the fluidized bed system is widely used in various chemical and petrochemical industries, etc. Above all, it is in use an an extremely advantageous system for the continuous treatment of gases or liquids in quantities.

In the fixed bed system, however, as often experienced when particulate material and liquid react, the reaction product or impurities adhere to the particulate material causing bridge formation or agglomeration of the particulate material. In the conventional fluidized bed system also, the motion of the particulate material in the bed is not uniform in most cases. Moreover, the classification by the motion helps create non-uniform portions causing the agglomeration of the particulate material, so that not only does it become impossible to withdraw the particulate material during the operation but, also, partially hampered fluidization brings about channeling or slugging which often has very remarkably adverse effects upon the adsorption, absorption or reaction.

Heretofore, in such a case, in order to overcome these difficulties there has been adopted, for example, a method in which the solid and liquid are brought in contact in a state of continuous mixing by stirring, in which case the particulate material is engaged in incessant movement. Hence, there is almost no occurrence of the bridging and agglomeration of the particulate material. However, the stirred mixing requires a large power and presents problems concerning the operation, such as maintenance of the stirrer, etc. Further, there are a number of other disadvantages. This is so because a semi-continuous process is necessitated in such a system. Thus, two or more sets of apparatus are compelled to be built together, requiring an enormous site area.

It is an object of this invention to provide a novel fluidized contact apparatus in which the above-described disadvantages have been obviated.

It is a further object of this invention to provide the characteristic features of the apparatus of this invention to produce the following excellent effects:

(1) An apparatus of a fluidized bed system for multi-stage continuous treatment;

(2) Since the particulate material is capable of moving as well as being withdrawn in each stage unit, all of the particulate material can be fully used;

(3) The quantity of the particulate material used within the capacity of the reactor can be varied at will. (This stems from the fact that the number of stages, if desired, can be conveniently reduced by keeping as many upper trays as desired empty, as well as the fact that the depth of the fluidized bed can be varied at will within the range of the spacing between the trays.)

(4) Since all the particulate material is uniformly in motion within the fluidized bed, and since the transfer of the particulate material from tray-to-tray is achieved in such a way that all the material is passed through the openings of trays in a short period of time, neither agglomeration nor the residence of particulate material occurs at all;

(5) Slugging, channelling, etc. are not seen during the operation. Other objects will be apparent hereinafter.

SUMMARY OF THE INVENTION

In order to explain more fully the above-described excellent effects of the apparatus of this invention, the fluidized contact apparatus of this invention will be compared with the conventional type of fluidized contact apparatus provided with sieve trays and downcomers.

One of the greatest advantages in the apparatus of this invention is that, in the same reactor, the quantity of particulate material being filled can be varied at will depending on the nature of the object being treated.

In order to perform a continuous operation by the use of the conventional type of fluidized contact apparatus, it was always necessary to provide a mechanism that renders possible the continuous downward flow of the particulate material. Downcomers are a typical example of such a mechanism. On the other hand, in the apparatus of the present invention, the flow passage of the fluid is used as the transfer passage of the particulate material, so that no special mechanism for the downflow of the particulate material is required. As a result due to such an operation, the great variability of the quantity of the particulate material being filled has been brought about. In a conventional downflow mechanism using downcomers, the quantity of particulate material being filled on a tray is restricted by the height of the downcomer of the tray. That is to say, the particulate material flowing down from an upper tray is fed to the bottom of a fluidized bed, where the particulate material preexisting within the bed is pushed up and its overflowing portion further transfers through the downcomer to a lower tray. Accordingly, even if it is intended to operate under the condition where the depth of the fluidized bed is smaller than the height of the downcomer, the particulate material cannot transfer, so that continuous operation becomes impossible.

In the apparatus of the present invention, the quantity of particulate material on a tray is arbitrarily determined and varied. Moreover, even if there are differences in the quantity between trays, it is not objectionable to the continuous operation. Thus, any material being treated which varies considerably in quantity, quality, etc. can be treated under optimum conditions so that this invention is quite effective from the industrial standpoint.

Furthermore, as the effect of requiring no downcomers, it may be mentioned that the particulate material can be used to high efficiency. When the transfer of the particulate material to downcomers occurs, some portion of the particulate material inevitably tends to remain unmoved or stay, depending on the position of the downcomer, so that the dead space is very apt to be formed within some parts of the bed containing the particulate material that has lost its activity. This phenomenon not only is undesirable from the viewpoint of the efficiency of the apparatus and the efficiency in use of the particulate material, but it also causes the agglomeration of the portion of the particulate material that is unmoved, which further leads to slugging or channelling, all of which may vary depending on the material being treated.

In the apparatus of the present invention, the so-called "spouted type" of fluidized bed is formed so that the reaction in the bed proceeds uniformly and, in operation, no non-moving occurs in any portion. Slugging or channelling also offer effectively no problem. Further, even if the particulate material should agglomerate during the reaction, depending on the nature of that material, the agglomerates formed are completely destroyed while the particulate material transfers to a lower tray. Therefore, the operation can be continued without any objection.

It is also one of the effects of this invention which cannot be overlooked that, because the transfer of the particulate material is such that the total quantity of that material on every tray transfers from tray to tray, the entire quantity of the particulate material can be made to contribute to the reaction completely to the extent of its full performance.

Besides the above, in this invention, the disadvantages that were considered inherent to the conventional downcomers, such as the clogging or the blowing upward of liquid from downcomers, etc. have been eliminated as a matter of course.

In addition, although it has already been stated that in the apparatus of the present invention continuous operation is possible without the agglomeration of the particulate material, it should be emphasized that no occurrence of the agglomeration is an extremely important requirement, especially in the waste water treatment. This is because, when the particulate material agglomerates and is unmoved even in part, if no bridge formation occurs, there results within the bed a portion, a shortage of dissolved oxygen, where anaerobic microorganisms grow up. As a result, the water being treated is spoiled or an unpleasant odor is generated.

The size of the openings located at the upper base of the frustum-shaped depressions of the trays is determined depending on the nature of the liquid, as well as of the particulate material. The total area of the openings is determined by selecting such a throat area ratio that a pressure drop sufficient to maintain the uniform distribution of the liquid can be obtained. For instance, in contact apparatus in which the diameter of tower is 3,200 mm$\phi$, the superficial velocity of water is 10 m/hr, the quantity of the particulate material being filled is 4.5 m³/tray, the liquid density is 1,000 kg/m³, and the relative particle density in liquid, 250 kg/m³, the pressure drop of 30 mm H$_2$O and the throat area ratio of 0.5% will suffice. In this way, the total area of the openings can be determined as a function of the diameter of tower, superficial velocity of water, quantity of the particulate material being filled, liquid and particle density, etc.

Usually the size of an opening is taken to be less than 100 mm square or an equivalent thereto by adjusting the number of openings, or the number of the frusta. Above 100 mm square, the pressure difference, i.e., the flow rate of the liquid necessary for preventing the particulate material from flowing down from openings during the operation, should be considerably large except where the density difference between the particulate material and the liquid used is extremely small, and so this is not practical. The lower limit in the size of an opening can be determined according to the physical properties of the particulate material and the liquid. Similarly, the upper limit can be determined as a matter of course, but it can be reduced to 3 mm square or an equivalent thereto.

For instance, in the case where, under the assumption that the fluid is water at room temperature and the particulate material is activated carbon, 450$\mu$ in an average particle size, having a bulk density of 0.25 g/cc in water, solid-liquid countercurrent contact is carried out by use of the solid-liquid contact apparatus of the structure of the present invention; the relationship between the opening diameter of trays and the minimum flow velocity of liquid required for the prevention of the particulate material from downflow is as shown in Table 1 below.

TABLE 1

| Opening diameter of depression (mm$\phi$) | Required minimum flow velocity of liquid (m/hr) |
|---|---|
| 3.0 | 10 |
| 27.6 | 180 |
| 41.6 | 320 |
| 62.9 | 420 |
| 100.0 | 1,000 |

The shape of the depressions provided in trays is not particularly limitative, but being regular in shape as conical or pyramidal frustum makes it possible to arrange the depressions in the trays in order. This possibility of arranging the depressions in order is a matter of great importance not only to insure that the solid-liquid contact on trays is uniform with respect to every tray, but also to prevent the particulate material from remaining on the tray when the particulate material is flowing down. It is also necessary, in order to make uniform the liquid stream on the tray, that the depressions are frustum-shaped. That is, the base of the truncated cone or truncated polygonal pyramide is parallel to the plane on which the openings lie. The angle of inclination of the sides of the depression is determined according to the nature of the particulate material, but if the angle between the inside surface of the frustum and the horizontal plane is greater than 20°, no trouble arises in the downflow of the particulate material. However, if it is smaller than 20°, the downflow of the particulate material is sometimes hampered.

In view of the objects of the invention, it is desirable that the spacing between the adjacent depressions in a tray is as close as possible; however, it need not be completely contiguous. On the other hand, when the spacing is too large, it should also be borne in mind that the particulate material which stays increases and eventually causes agglomeration as a matter of course. Thus, the depressions should be provided in such a way that they are as contiguous to each other as possible if nothing interferes with the fabrication (as well as the structure of the tray), and if it is not possible to do so as a result of the position of the reinforcing material, etc., they are provided in closely spaced apart relation to the greatest possible extent. Also, if it is not avoidable that dead space is formed, depending on the nature of the liquid being treated as well as the size and shape of the particulate material, etc., there should be provided a separate means for preventing the particulate material from staying on the trays.

In order to perform the solid-liquid contact by the use of the apparatus of this invention, liquid is first fed to a tower and then each of the trays, except the uppermost one, is filled with particulate material. Thereafter, the particulate material is continuously supplied to the uppermost tray to initiate the adsorption, absorption or reaction. During operation, the particulate material is always in motion by virtue of the liquid stream, forming a fluidized bed on every tray. Simultaneously with the initiation of the reaction, the particulate material is continuously withdrawn from the lowermost tray and, when the lowermost tray has become almost empty, the liquid is withdrawn. Then the liquid becomes a descending current, being accompanied by the particulate material which also falls through the openings of the depressions to the respective lower trays. When almost one tray full of particulate material has fallen, the withdrawal of the liquid is stopped and the stationary operation is resumed. Alternatively, it is also possible that instead of continuously withdrawing the particulate material on the lowermost tray, that tray full of particulate material is withdrawn at a given time and, at the same time, a descending current of the liquid is created so as to make the particulate material fall from every tray to the tray underneath it. In this way, the particulate material can be used in high efficiencies without bringing about the uneven residence time within the tower due to the classification of the particulate material, which has been regarded as one of the disadvantages of the conventional fluidized bed.

Also, even when a portion of the particulate material has become massive, either by adhesion or by deposition, the solid masses formed can be readily broken up by the transposition of the particulate material during the fall, so that troubles due to adhesion or deposition can be prevented. Further, the particulate material falls through the openings of the depressions in a fixed-bed situation so that the transposition of the particulate material occurs in a sequential manner and, hence, the lowering in the efficiency due to the short pass, etc. can be avoided. However, it is here desirable that, in order to completely prevent the short pass of the particulate material as well as of the liquid, the openings of the upper and lower trays are not allowed to line up on a common vertical axis.

For the purpose of comparison of a solid-liquid contact apparatus, especially a fixed-bed contact apparatus with the apparatus of the present invention, shown as an example is the adsorption of minute quantities of organic matter in waste water where use is made of activated carbon as the particulate material. In the ordinary fixed bed adsorber, in order to prevent the clogging of the interstice between particles, a back-wash procedure is required. However, in the apparatus provided with the trays of the present invention, such a procedure is not required. Also, when the backwash is carried out in a fixed-bed, efficiency decreases as a result of the back mixing of the particulate material whereas, in the apparatus of the present invention, such is not the case.

Further, in a fixed bed, the activated carbon particles sometimes adhere to each other (so-called "mud balls" are formed) by the action of oily matter or the like, leading to channelling which may lower the efficiency. But in the apparatus of the present invention, in which the particulate material is always in motion as above stated, such trouble is effectively never encountered.

In addition to the above, in a fixed-bed, as a result of channelling and the like, there is formed within the bed a portion with a shortage of DO (dissolved oxygen), where anaerobic microorganisms grow and they sometimes spoil the water being treated or impregnate the water with a disagreeable odor. In the apparatus of the present invention, because of the incessant motion of the activated carbon as well as the uniform distribution of water, DO is rarely so deficient that anaerobic microorganisms may not spring up.

Very often, in a fixed-bed, as a result of the above described "mud balls", anaerobic microorganisms, etc., the withdrawal of activated carbon does become impossible. However, since the present invention is free from these things, almost no trouble of this type arises.

In order to make this invention more understandable, explanation will be given below with reference to the drawings.

DETAILED DESCRIPTION OF THE DRAWINGS

Figure 1:
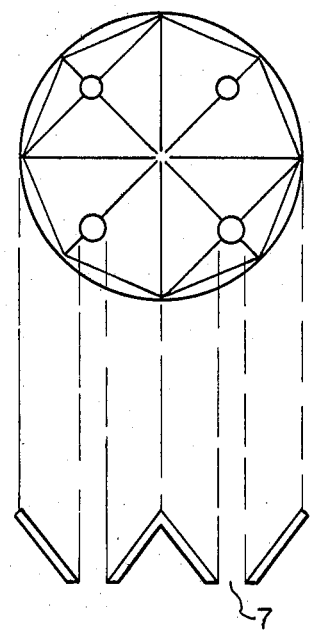
FIG. 1 is a front view of a tray of the present apparatus.
Figure 2A:
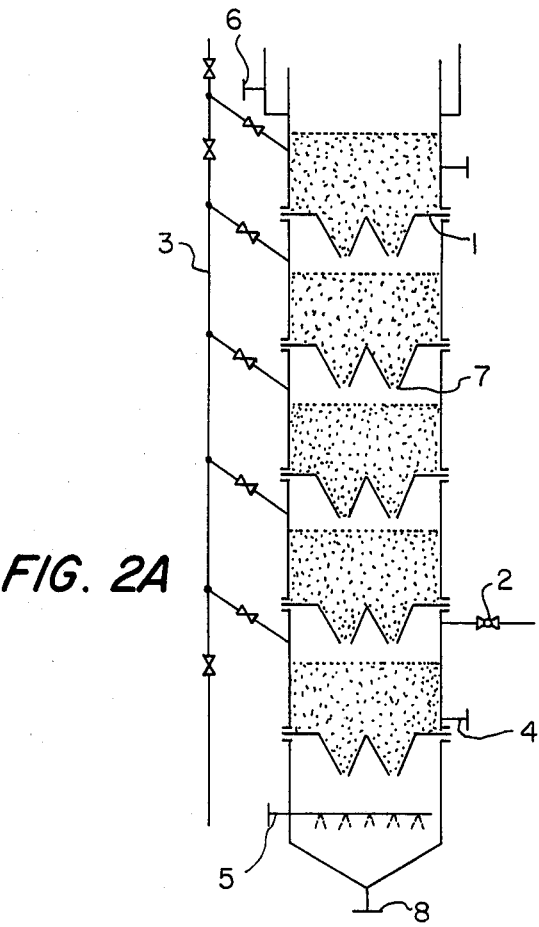
FIGS. 2A and 2B are cross-sectional views of the contact apparatus.
Figure 2B:
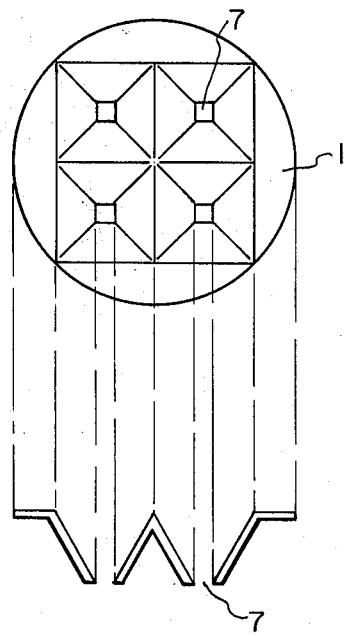

FIG. 2 indicates the cross-sectional view of the whole body of the solid-liquid contact apparatus of this invention, and FIG. 1 illustrates one example of tray 1 in FIG. 2. The solid-liquid contact apparatus is provided with a plurality of trays, each of which is tray 1 having a number of quadrangular, pyramid-shaped depressions with a quadrangular hole 7 at the bottom, as shown in FIG. 2, and the particulate material 9 on each of the trays is brought into contact with the liquid rising up through the holes. In this case, within the quadrangular pyramid, as shown in FIG. 2, the particulate material is always in motion, forming a fluidized bed. Also, on every tray, contact is achieved which is close to complete mixing. The particulate material which finished a solid-liquid contact in this way is transferred to the lower tray in a manner as described below.

By opening valve 2, the liquid is withdrawn by virtue of a head and, at the same time, the upflow of the liquid is changed to a downflow which causes the particulate material on every tray to fall through holes 7 in the quadrangular pyramids accompanying the liquid. Thus, after the particulate material has been allowed to fall from an upper tray to a lower tray, valve 2 is closed. Meanwhile, the flow of the liquid being fed to the bottom of the tower may be either stopped or continued. When stopped, after closing valve 2, the flow is again begun. Since, in this case, the particulate material flows down onto the lowermost part of the tower, it is necessary to prevent the particulate material from flowing down onto the lowermost part of the tower, either by placing a board beneath the openings of the lowermost tray or by replacing only the lowermost tray by a specially devised tray. The withdrawal of the liquid should be made in such a way that the liquid may be withdrawn in such an amount as required to permit almost all the quantity of the particulate material on an upper tray to fall onto the next-lower tray.

Alternatively, one tray full of particulate material may be withdrawn at a time so that the particulate material on every tray can simultaneously fall down from an upper tray to the next-lower tray.

The particulate material is fed in a continuous matter by means of nozzle 3 attached over the uppermost tray and is withdrawn by means of nozzle 4 attached over the lowermost tray. Thus, the definite quantity of particulate material fed to the uppermost tray successively falls down onto the lower trays intermittently after a definite period of time in the above-described way and, when it has finally reached the lowermost tray, it is withdrawn. On the other hand, the liquid is constantly, except for a very short period of time when valve 2 is open, fed from nozzle 5 and is discharged from nozzle 6 after contacting with the particulate material on every tray. In this way, an almost continuous operation is rendered possible.

As for the shape of the depressions in the trays, these may also be shapes other than regular polygonal pyramids, such as the trapezoidal pyramid shown in FIG. 1 and, if they are arranged in order, the object of this invention can be achieved as well.

The apparatus of this invention can be efficiently utilized, not only in reference to the solid-liquid contact reaction, but also to the solid-liquid-gas and solid-gas contact reaction. Also, depending on the kind of the particulate material, the apparatus of this invention can be effectively used in all the reactions such as adsorption, absorption, catalytic decomposition, etc. that are conventionally performed by the utilization of the fluidized bed.

Several examples of this invention will be explained below.

EXAMPLE 1

FIG. 2 indicates a tower made of polyvinyl chloride, 16 inches in diameter, which is provided with three trays made of polyvinyl chloride, each 450 mm spaced apart, having quadrangular pyramid-shaped depressions. The detailed shape of the depressions in the trays is of a structure consisting of four adjacent quadrangular pyramids as shown in FIG. 2, each frustum of a quadrangular pyramid being such that the base is 132×132 mm, the height is 102 mm, and the diameter of the opening is 14×14 mm square. Using as the particulate material activated carbon, 350–800μ in particle diameter and, as the liquid, water containing butanol, the absorption of butanol by the activated carbon was carried out under the conditions as shown in Table 2 below.

TABLE 2

| Quantity of liquid treated | 1.2 m³/hr |
|---|---|
| Superficial velocity of water | 10 m/hr |
| Concentration of butanol in raw water | Average 340 TOD ppm |
| Quantity of activated carbon fed | 5.5 l/hr |
| Quantity of activated carbon withdrawn | 5.5 l/hr |
| Quantity of activated carbon filled | 33 l/tray |
| Time interval of tray-to-tray transfer | 6 hr (Except the first transfer after the first passage of water, which was made after 12 hours.) |

The water treated was withdrawn from each tray at 2-hour intervals from the eighth hour after the initiation of the passage of water to measure the TOD concentration (the total oxygen comsumption). The results are shown in Table 3.

As can be clearly seen from Table 3, the water treated has uniform concentration and the operation could be so stationary that no difficulty whatever was encountered.

EXAMPLE 2

Using the tower used in Example 1 as such, water containing an oil (n-hexane extract) in a concentration of 5 ppm in place of butanol was passed through the tower and an experiment was carried out as to whether activated carbon deposits by adhesion occurred.

TABLE 3

Variation in Butanol Concentration

| TOD concentration (ppm) | Time of water passage (hr) | | | | | |
|---|---|---|---|---|---|---|
| | 8 | 10 | 12 | 14 | 16 | 18 |
| Raw Water | 365 | 340 | 315 | 335 | 343 | 340 |
| Treated Water on 1st stage | 209 | 270 | 276 | 333 | 325 | 233 |
| Treated Water on 2nd stage | 74 | 104 | 143 | 166 | 205 | 105 |
| Treated water on 3rd stage | 57 | 94 | 55 | 59 | 66 | 64 |
| Presence or absence of tray-to-tray transfer of activated carbon | Abs.* | Abs. | Pr.** | Abs. | Abs. | Pr. |

| TOD concentration (ppm) | Time of water passage (hr) | | | | | |
|---|---|---|---|---|---|---|
| | 20 | 22 | 24 | 26 | 28 | 30 |
| Raw water | 335 | 325 | 330 | 327 | 317 | 345 |
| Treated water on 1st stage | 297 | 306 | 245 | 293 | 312 | 200 |
| Treated water on 2nd stage | 152 | 193 | 103 | 158 | 204 | 107 |
| Treated water on 3rd stage | 71 | 67 | 67 | 69 | 69 | 71 |
| Presence or absence of tray-to-tray transfer of activated carbon | Abs. | Abs. | Pr. | Abs. | Abs. | Pr. |

*Abs. is abbreviation for absence
**Pr. is abbreviation for presence

In this experiment, however, the number of the trays used was only one and the oil-containing water was continuously passed through without feeding or withdrawing the activated carbon. The experimental conditions employed were as follows:

TABLE 4

| Quantity of water treated | 1.2 m³/hr |
|---|---|
| Superficial velocity of water | 10 m/hr |
| Oil concentration of raw water (n-hexane extract) | 5 ppm |
| Quantity of activated carbon filled | 36 l/tray |

When use was made of a sieve tray in place of the present tray, the oil caused the deposition of the activated carbon by adhesion on the third day after the initial passage of water whereas, in the use of the present tray, no such deposition by adhesion resulted even after two weeks. In view of this fact, it is clearly shown that the use of the present tray renders difficult the deposition by adhesion of particulate material.

EXAMPLE 3

Figure 3A:
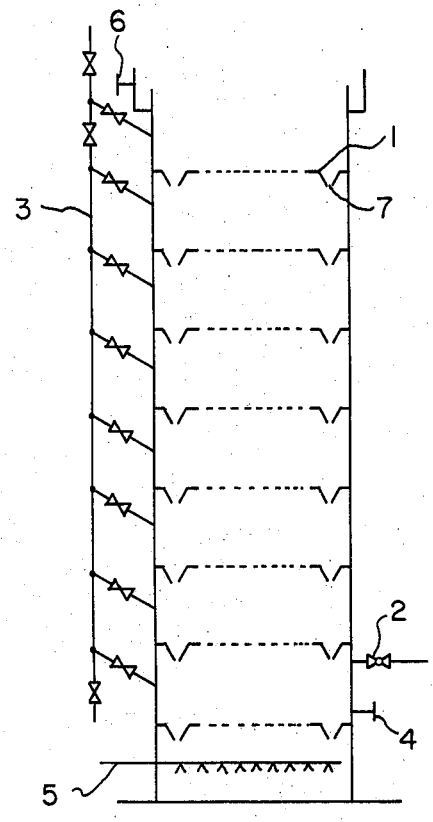
FIGS. 3A and 3B are other embodiments of the apparatus of FIG. 2.
Figure 3B:
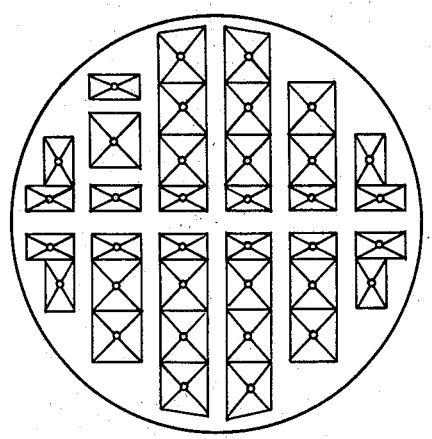

Using an apparatus as shown in FIG. 3, which was provided with eight trays having the shape as shown in FIG. 3, the following waste water from an oil refinery was treated with activated carbon to effect the absorption of the COD component.

| (A) Details in Apparatus: | | | |
|---|---|---|---|
| (1) | Shape of depression in trays Frustum of a quadrangular pyramid (2 kinds of frusta) | Base: | 420 × 420 mm |
| | | Height: | 350 mm |
| | | Diameter of opening: | 30 mm square |
| | | Base: | 210 × 420 mm |
| | | Height: | 350 mm |
| | | Diameter of Opening: | 30 mm square |
| (2) | Spacing between trays | | 850 mm |
| (3) | Number of trays | | 8 |
| (4) | Inside diameter of tower | | 3,200 mm |
| (5) | Height of tower | | 9,125 mm |

| (B) Treatment Conditions: | | |
|---|---|---|
| (1) | Quantity of water passed | 80 m³/hr |
| | Superficial velocity of water | 10 m/hr |
| | Average COD concentration of raw water | 41 ppm |
| (2) | Particle diameter of activated carbon | 300μ–700μ 460μ in average |
| | Relative bulk density of activated carbon in water | 0.25 g/cc |
| | Quantity of activated carbon filled | ca. 1.4 t/tray |
| | Time interval of tray-to-tray transfer of activated carbon | 48 hr. |
| | Quantity of activated carbon fed | 30 kg/hr |
| | Quantity of activated carbon withdrawn | 30 kg/hr |

| (C) Results of Treatment: | |
|---|---|
| Average COD concentration of the water treated | 9 ppm |

EXAMPLE 4

Using the same apparatus as in Example 3, but varying the water being treated, another experiment was carried out. The results are shown below:

| (1) | Raw Water | COD | 39 ppm |
|---|---|---|---|
| | | Oil | 2.5 ppm |
| | | Phenol | 4 ppm |
| (2) | Water Treated | COD | 10 ppm |
| | | Oil | 0.4 ppm |
| | | Phenol | Undetectable |

In addition, in this experiment, the average COD was measured with respect to the water treated on each tray. The results are shown below:

| | Ordinal number of trays | | | | | | | |
|---|---|---|---|---|---|---|---|---|
| Raw Water | 1 | 2 | 3 | 4 | 5 | 6 | 7 | 8 |
| COD 41 ppm | 29 | 21 | 18 | 17 | 15 | 13 | 11 | 10 |

When the same waste water was treated with activated carbon using conventional sieve trays, the deposition of the activated carbon by adhesion took place within a few days, hindering the operation. This also indicates that the present apparatus makes difficult the deposition by adhesion of particulate material.

Examples 1 and 3 are evidence that the present apparatus can produce uniform concentrations of the treated water, and Example 2 illustrated that the present apparatus is capable of continuing stationary operation without any trouble, such as deposition by adhesion, etc. Also, as stated in Examples 2 and 3, the use of other types of trays proved a hindrance to the operation as a result of the deposition by adhesion of activated carbon, etc. In view of these results, it may be concluded that, in particular, the present apparatus is possessed of the above described functions and is applicable to a solid-liquid system of the kind in which the solid-liquid contact was considered difficult owing to deposition by adhesion of particulate material, classification, back mixing, etc.

In addition, it is a common practice that all the trays are unified into those of the same size and shape from the aspect of the fabrication of trays and for the purpose of obtaining uniform efficiency in solid-liquid contact on each tray. However, this is not a restriction for the achievement of the object of this invention.

EXAMPLE 5

Using the apparatus indicated, an experiment was conducted involving the following apparatus and conditions:

| Experimental Equipment: | | |
|---|---|---|
| (1) | Reaction Tower: | Inside diameter 16 inches |
| (2) | Number of Trays: | 5 |
| (3) | Depressions: | |
| | (a) The arrangement of depressions on a tray is shown on the attached drawing. | |
| | (b) A total of hole areas of 4 depressions are arranged so as to equal the hole area of 1 depression. | |
| | (c) A slanting surface is arranged at an angle of approximately 60° to a horizontal surface. | |

| Experimental Conditions: | | |
|---|---|---|
| (1) | Water Flow Rate: | 1.2 m³/hr (Superficial velocity 10 m/hr) |
| (2) | Quantity of fed active carbon: | 33 l/tray |
| (3) | Time interval between transfers of active carbon from tray-to-tray | 6 hours |
| (4) | Water to be treated: | waste water (containing butanol) |
| (5) | Others: | To the uppermost tray, active carbons are fed at a rate of 5.5 l/hr. When the quantity reaches 33 l, the whole quantity is transfered to the next tray. |

| Result of Experiment: | 4-Depression Tray | 1-Depression Tray |
|---|---|---|
| Raw water | 74 | 74 ppm COD |
| Treated Water | | |
| First Stage | 65 | 69 |
| Second Stage | 55 | 63 |
| Third Stage | 29 | 53 |
| Fourth Stage | 16 | 41 |
| Fifth Stage | 9 | 26 |

The reasons why the results of an apparatus using a tray with four depressions are better than in the case of a tray having only one depression is that it is inevitable (in the case of only one depression) for treated water to blow off so that uniform fluidized bed cannot be formed and the efficiency in contact of active carbon and water is worsened.

EXAMPLE 6

The waste water, which contained phenols, amines and aromatic hydrocarbons, discharged from the thermal cracking process in petroleum refining was subjected to de-COD treatment using activated carbon, 550 microns in average diameter, having a bulk density of 620 kg/m$^3$.

As the tray in the reactor use was made of the three kinds: (a) one having nine depressions, (b) one having four depressions, and (c) one having only one depression as shown in the accompanying drawing, the effect of this invention in the treatment of the actual industrial waste water was examined together with the comparative effects of these different kinds of trays.

Reaction Conditions

Three kinds of reactors were arranged in parallel and the water treatment was carried out by passing through each of the reactors the raw water containing about 60 ppm of COD at pH 7.5 at a superficial velocity of 10 m/hr so that the fluidized bed height attains 500 mm. The results are shown in Table 1 below, as well as in the accompanying drawings.

As can be clearly seen from these results, the properties of the treated water become improved in the order of (C)→(B)→(A). This is because, in the reactor provided with tray (C), the packed layer forms a boiling bed under the conditions employed in this example while, in the reactors provided with tray (B) or tray (A) having a plurality of depressions, a fluidized bed is formed.

TABLE 1

| | | COD (ppm) | | |
|---|---|---|---|---|
| Time (hr) | Raw Water | Treated Water With (A) | Treated Water With (B) | Treated Water With (C) |
| 0.5 | 53 | 9 | 10 | 11 |
| 1.5 | 67 | 11 | 12 | 14 |
| 4.5 | 63 | 15 | 14 | 21 |
| 7.5 | 65 | 20 | 19 | 28 |
| 10.5 | 61 | 25 | 25 | 34 |
| 13.5 | 68 | 29 | 35 | 41 |
| 16.5 | 64 | 37 | 41 | 47 |
| 19.5 | 59 | 42 | 44 | 51 |
| 22.5 | 66 | 43 | 49 | 53 |
| 25.5 | 63 | 43 | 41 | 52 |
| 28.5 | 57 | 53 | 55 | 56 |

TABLE 1-continued

| | | COD (ppm) | | |
|---|---|---|---|---|
| Time (hr) | Raw Water | Treated Water With (A) | Treated Water With (B) | Treated Water With (C) |
| 31.5 | 70 | 56 | 56 | 57 |
| 34.5 | 72 | 55 | 57 | 59 |
| 37.0 | 61 | 57 | 59 | 59 |

In general, the larger the number of depressions, the more uniform and the more stable is the fluidized bed formed, the more approaching a state close to the state found in use of the so-called sieve tray.

Thus, it is considered that the above results are due to the fact that the contact efficiency increases in the order of (C)→(B)→(A) from the above reasoning.

In some of the Examples set forth in this specification, in order to clear up the effect of the apparatus of this invention, the experiment was carried out using an artificial waste water containing butanol.

The present invention may be embodied in other specific forms without departing from the spirit or essential characteristics thereof. The presently disclosed embodiments are, therefore, to be considered in all respects as illustrative and not restrictive. The scope of the invention is indicated by the appended claims, rather than the foregoing description, and all changes which come within the meaning and range of equivalency of the claims are therefore intended to be embraced therein.

What is claimed:

1. An apparatus adapted for contact between divergent materials, and capable of forming a fluidized bed condition, comprising:
    a plurality of trays, each of said plurality of trays being structured so as to have thereon a multiplicty of inverted frustum-shaped depressions adjacent to each other, each of said inverted frustum-shaped depressions being shaped so as to have a widened upper opening and inner lateral faces which incline inwardly from said upper opening to a narrowed lower opening at the bottom of said inverted frustum-shaped depressions, said trays being positioned vertically over each other so as to form a tower, said trays being positioned in such a manner that the lower narrowed opening of each of said inverted frustum-shaped depressions is vertically skewed with respect to each of the lower narrowed openings in each of the inverted frustum-shaped depressions in the next vertically positioned tray, in said tower;
    a housing surrounding said trays so as to form a support for said tower;
    a particulate feeding means provided on said tower with respect to each of said trays;
    a particulate material withdrawing means located on said tower;
    a liquid feeding means located on said tower; and
    a liquid discharge means located on said tower.

2. An apparatus as in claim 1, wherein each of said inverted frustum-shaped depressions is comprised of inner lateral faces which make an inclined angle of greater than 20° with respect to the upper surface of the tray.

3. An apparatus as in claim 1, wherein said liquid feeding means is a nozzle located over the highest of said vertically spaced trays, and wherein said liquid discharge means is a nozzle located over the lowest of said vertically spaced trays.

* * * * *